(12) United States Patent
You et al.

(10) Patent No.: US 10,159,090 B2
(45) Date of Patent: Dec. 18, 2018

(54) METHOD FOR TRANSMITTING, TO MTC DEVICE, PDSCH INCLUDING DOWNLINK DATA, AND BASE STATION THEREFOR

(71) Applicant: LG ELECTRONICS INC., Seoul (KR)

(72) Inventors: Hyangsun You, Seoul (KR); Joonkui Ahn, Seoul (KR); Suckchel Yang, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 138 days.

(21) Appl. No.: 15/027,223

(22) PCT Filed: Oct. 7, 2014

(86) PCT No.: PCT/KR2014/009433
§ 371 (c)(1),
(2) Date: Apr. 4, 2016

(87) PCT Pub. No.: WO2015/064924
PCT Pub. Date: May 7, 2015

(65) Prior Publication Data
US 2016/0234859 A1    Aug. 11, 2016

Related U.S. Application Data

(60) Provisional application No. 61/897,803, filed on Oct. 30, 2013.

(51) Int. Cl.
*H04W 72/12* (2009.01)
*H04B 7/26* (2006.01)
(Continued)

(52) U.S. Cl.
CPC ...... *H04W 72/1273* (2013.01); *H04B 7/2656* (2013.01); *H04L 5/0044* (2013.01);
(Continued)

(58) Field of Classification Search
CPC ............ H04W 72/1273; H04W 4/005; H04W 72/0446; H04W 72/1289; H04B 7/2656; H04L 5/0007; H04L 5/0048
See application file for complete search history.

(56) References Cited

U.S. PATENT DOCUMENTS

2012/0281555 A1* 11/2012 Gao ................. H04L 5/0051
370/252
2013/0195041 A1   8/2013 Papasakellariou et al.
(Continued)

OTHER PUBLICATIONS

PCT International Application No. PCT/KR2014/009433, International Search Report dated Jan. 8, 2015, 1 page.
(Continued)

*Primary Examiner* — Jae Y Lee
(74) *Attorney, Agent, or Firm* — Lee Hong Degerman Kang & Waimey

(57) ABSTRACT

One embodiment of the present specification provides a method for transmitting, to a machine type communication (MTC) device, a physical downlink shared channel (PDSCH) including downlink data. The method can comprise the steps of: mapping the PDSCH on a resource element (RE) of a first subframe among a plurality of subframes and transmitting the same, when a base station performs PDSCH bundle transmission for repeatedly transmitting the same PDSCH to the MTC device on the plurality of subframes; and mapping, by the base station, the PDSCH on an RE of a second subframe among the plurality of subframes with respect to the RE of the first subframe, on which the PDSCH is mapped, to enable the MTC device to decode a bundle of the PDSCHs through the combination of RE units, and transmitting the same.

13 Claims, 17 Drawing Sheets

(51) Int. Cl.
*H04L 5/00* (2006.01)
*H04W 72/04* (2009.01)
*H04W 4/70* (2018.01)

(52) U.S. Cl.
CPC ............ *H04L 5/0048* (2013.01); *H04W 4/70* (2018.02); *H04W 72/0446* (2013.01); *H04W 72/1289* (2013.01); *H04L 5/0007* (2013.01)

(56) References Cited

U.S. PATENT DOCUMENTS

2015/0029903 A1* 1/2015 Chen ................. H04W 72/0446
370/277
2016/0192333 A1* 6/2016 Wang ..................... H04W 4/70
370/329

OTHER PUBLICATIONS

CATT, "PDSCH Coverage Improvement for low-cost MTC UEs," 3GPP TSG RAN WG1 #74bis, R1-134089, Oct. 7-11, 2013, 3 pages.
ZTE, "Discussion on Traffic Channel Coverage Improvement," 3GPP TSG RAN WG1 #74bis, R1-134304, Oct. 7-11, 2013, 7 pages.
LG Electronics Inc., "PDSCH/PUSCH Coverage Enhancement for MTC," 3GPP TSG RAN WG1 #74bis, R1-134394, Oct. 7-11, 2013, 6 pages.
MediaTek Inc., "Analysis of (E)PDCCH Enhancements and Timing Relationship with PDSCH," 3GPP TSG-RAN WG1 #74b, R1-134444, Oct. 7-11, 2013, 5 pages.

* cited by examiner

FIG. 12
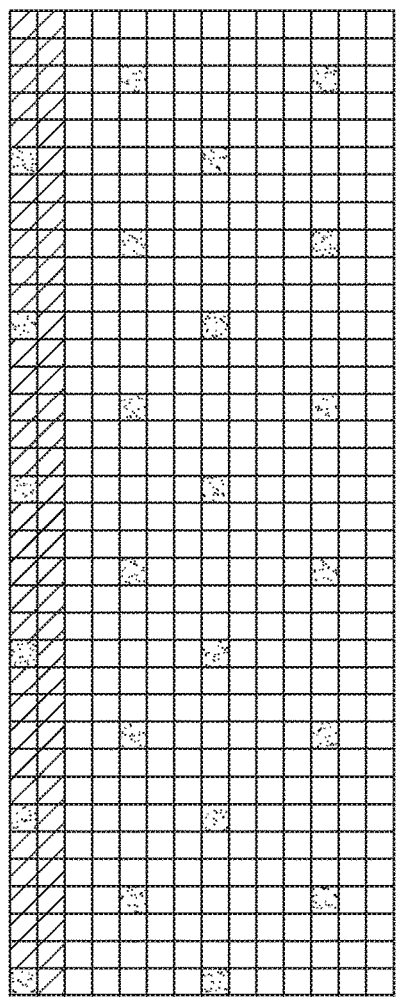
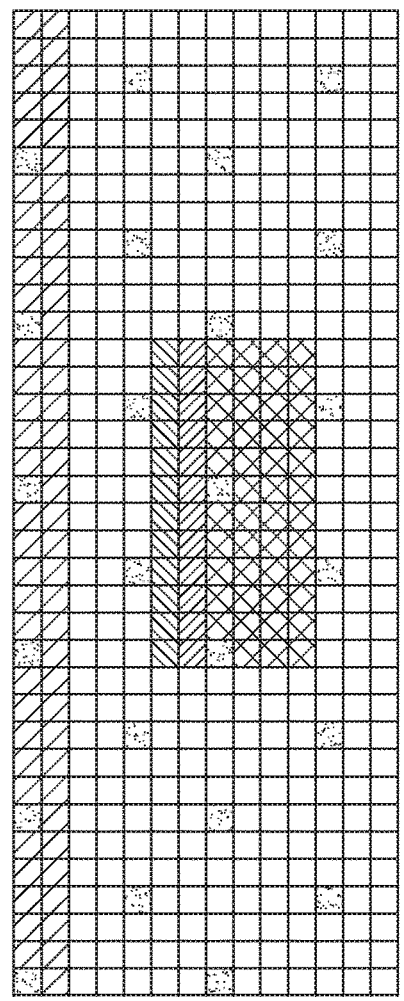
(a)          (b)

METHOD FOR TRANSMITTING, TO MTC DEVICE, PDSCH INCLUDING DOWNLINK DATA, AND BASE STATION THEREFOR

CROSS-REFERENCE TO RELATED APPLICATIONS

This application is the National Stage filing under 35 U.S.C. 371 of International Application No. PCT/KR2014/009433, filed on Oct. 7, 2014, which claims the benefit of U.S. Provisional Application No. 61/897,803, filed on Oct. 30, 2013, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC apparatuses, wide service areas, low traffic for each MTC apparatus, etc.

Recently, it is considered to extend cell coverage of a BS for an MTC apparatus, and various schemes for extending the cell coverage are under discussion. However, when the cell coverage is extended, if the BS transmits a channel to the MTC apparatus located in the coverage extension region as if transmitting a channel to a normal UE, the MTC apparatus has a difficulty in receiving the channel.

Further, as the MTC apparatus is expected to have low performance in order to supply more MTC apparatuses at a low price, if the BS transmits a PDCCH or a PDSCH to the MTC apparatus located in the coverage extension region as if transmitting a PDCCH or a PDSCH to a normal UE, the MTC apparatus has a difficulty in receiving the PDCCH or the PDSCH.

SUMMARY OF THE INVENTION

Accordingly, the disclosure of the specification has been made in an effort to solve the problem.

In order to accomplish the object described above, according to a disclosure of the present specification, when a machine type communication (MTC) type device is located in a coverage extension area of a BS, it may be implemented for the BS to repeatedly transmit (i.e., bundle transmission) a PDCCH or a PDSCH on several subframes.

However, in case that a transmission of a bundle of PDCCHs and a bundle of PDSCHs is started from the same subframe, although the MTC device does not receive accurate scheduling information until completing reception of the bundle of PDCCHs, the MTC device should start to receive the bundle of PDSCHs. At the moment, since the MTC device is still not available to decode the bundle of PDSCHs, the MTC device is not available to store and combine the information in the PDSCH in a bit level or a symbol level. Consequently, the MTC device assumes that each PDSCH in the bundle of PDSCHs is received on the same RE location in each subframe, and should combine with the same RE (i.e., RE level combining).

However, although the MTC device assumes that each PDSCH in the bundle of PDSCHs is received on the same RE location in each subframe, and performs to combine with the same RE as such, there is a problem that actually the BS may not transmit each PDSCH in the bundle of PDSCHs on the same RE location in each subframe.

To achieve the aforementioned aim, one disclosure of the present specification provides a method for transmitting a physical downlink shared channel (PDSCH) including downlink data to a machine type communication (MTC) device. The method may comprise: if a base station is to perform a transmission of a bundle of PDSCHs such that same PDSCH are repeatedly transmitted on a plurality of subframes to the MTC device, mapping the PDSCH to a resource element (RE) of a first subframe among the plurality of subframes and transmitting the mapped PDSCH; and mapping, by the base station, the PDSCH to a RE of a second subframe among the plurality of subframes and transmitting the mapped PDSCH based on the RE of the first subframe on which the PDSCH is mapped in order to enable the MTC device to decode a bundle of PDSCHs through a combination of REs.

The method may further comprise: performing a transmission of a bundle of PDCCHs including scheduling information on the bundle of PDSCHs such that the PDCCH are repeatedly transmitted on the plurality of subframes.

The PDSCH may be punctured on a location of the corresponding RE of the second subframe, if a location identical to a RE location of the first subframe to which the PDSCH is mapped is used for other channel and signal in the second subframe.

If other channel or other signal is mapped to a RE of the second subframe which is located in a specific RE of the first subframe, a zero-power transmission is performed on the specific RE of the first subframe.

The method may further comprise: determining REs of the first subframe and REs of the second subframe to perform rate-matching the PDSCH.

The determining the REs may include: excluding a RE in an OFDM symbol on which a PDCCH is transmitted and a RE to which cell-specific reference signal (CRS) is transmitted.

If the PDCCH is transmitted on a second or a third OFDM symbol of the first subframe but the PDCCH is not transmitted on a second or a third OFDM symbol of the second subframe, a PDSCH mapped to a RE of other symbol is copied to a RE on the corresponding OFDM symbol of the second subframe.

To achieve the aforementioned aim, one disclosure of the present specification provides a base station transmitting a physical downlink shared channel (PDSCH) including downlink data to a machine type communication (MTC) device. The base station may comprise: a RF transmitting and receiving unit; and a processor configured to perform: mapping the PDSCH to a resource element (RE) of a first subframe among the plurality of subframes and transmitting the mapped PDSCH if the base station is to perform a transmission of a bundle of PDSCHs such that same PDSCH are repeatedly transmitted on a plurality of subframes to the MTC; and mapping the PDSCH to a RE of a second subframe among the plurality of subframes and transmitting the mapped PDSCH by the base station based on the RE of the first subframe on which the PDSCH is mapped in order to enable the MTC device to decode a bundle of PDSCHs through a combination of REs.

Advantageous Effects

According to a disclosure of the present invention, the problem of the related art described above will be solved. In more particularly, according to a disclosure of the present specification, a reception performance and a decoding performance of a machine type communication (MTC) device located on a coverage extension area of a BS can be improved.

BRIEF DESCRIPTION OF THE DRAWINGS

FIG. 12 illustrates an example of comparing subframes which a bundle of PDCCHs and a bundle of PDSCH are transmitted.

DESCRIPTION OF EXEMPLARY EMBODIMENTS

Figure 1:
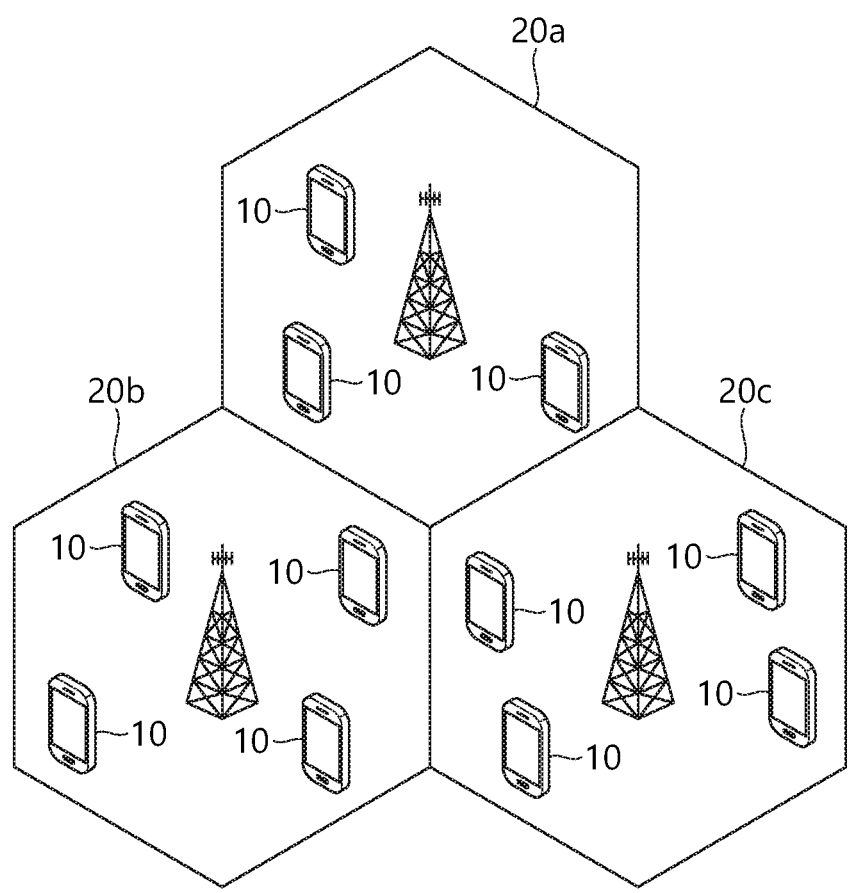
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response.

In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
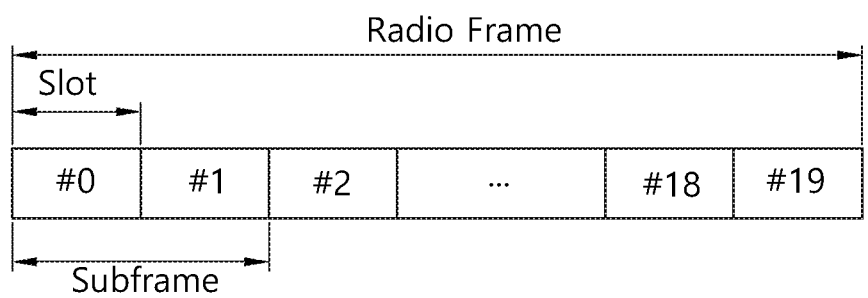
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
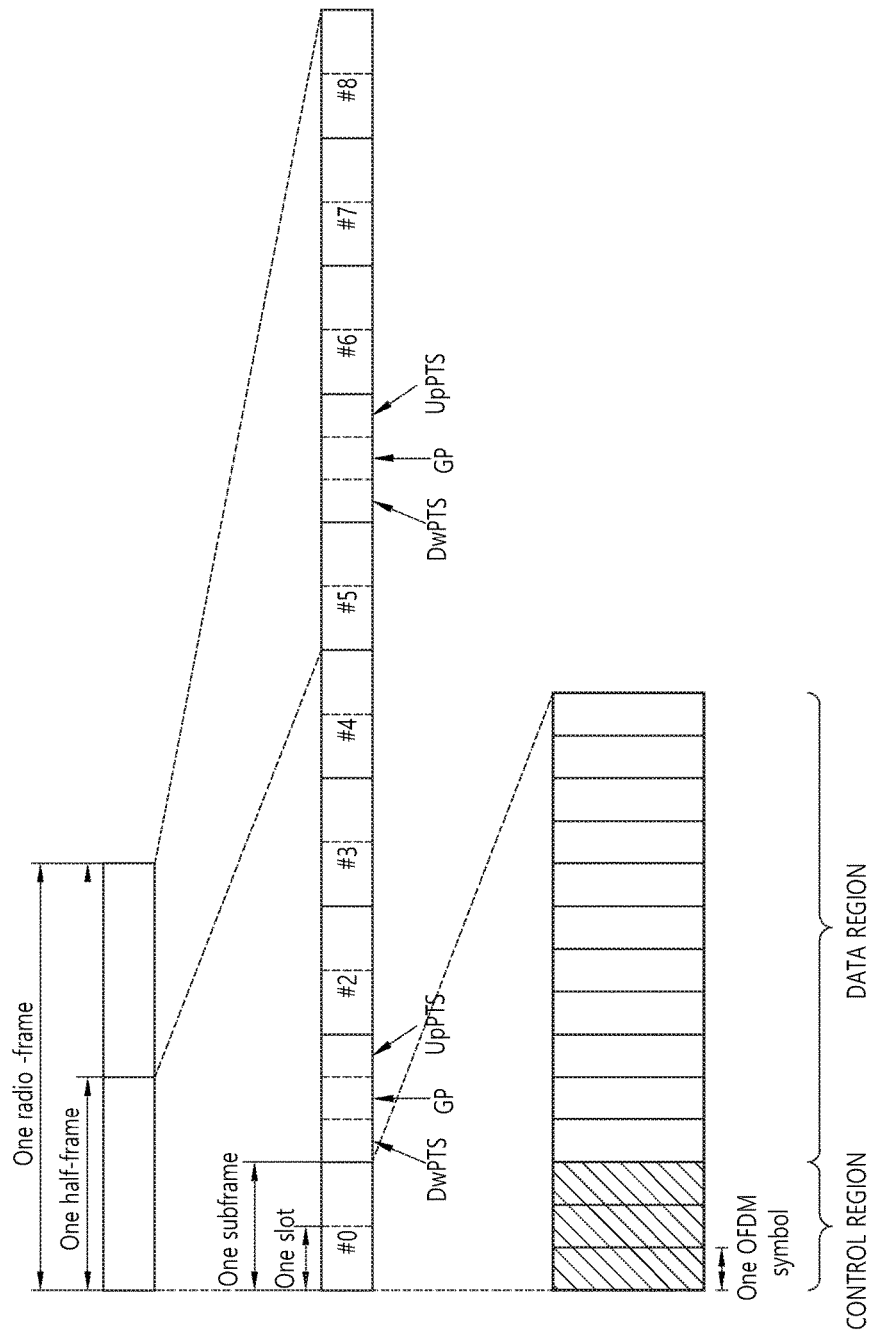
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point perio-dicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
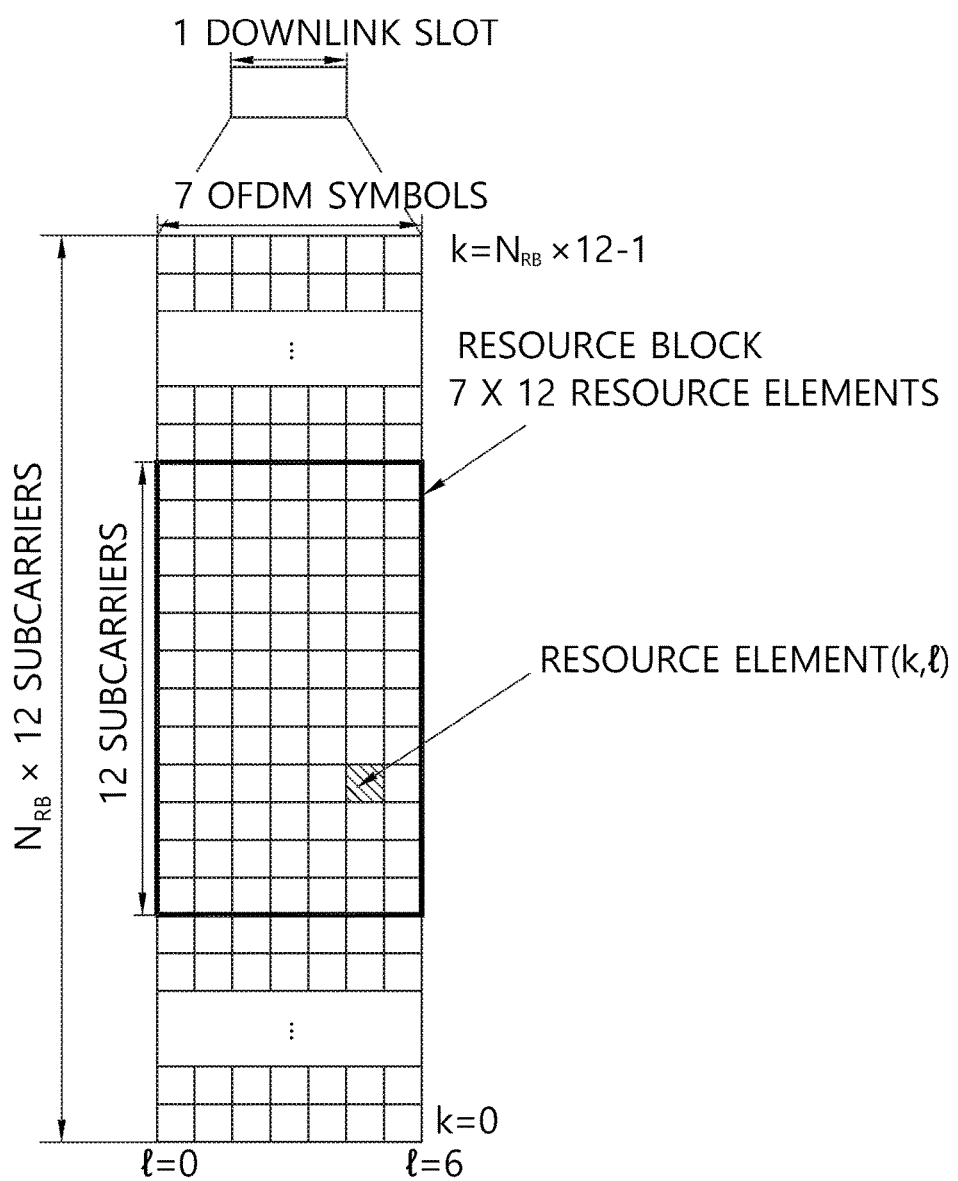
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
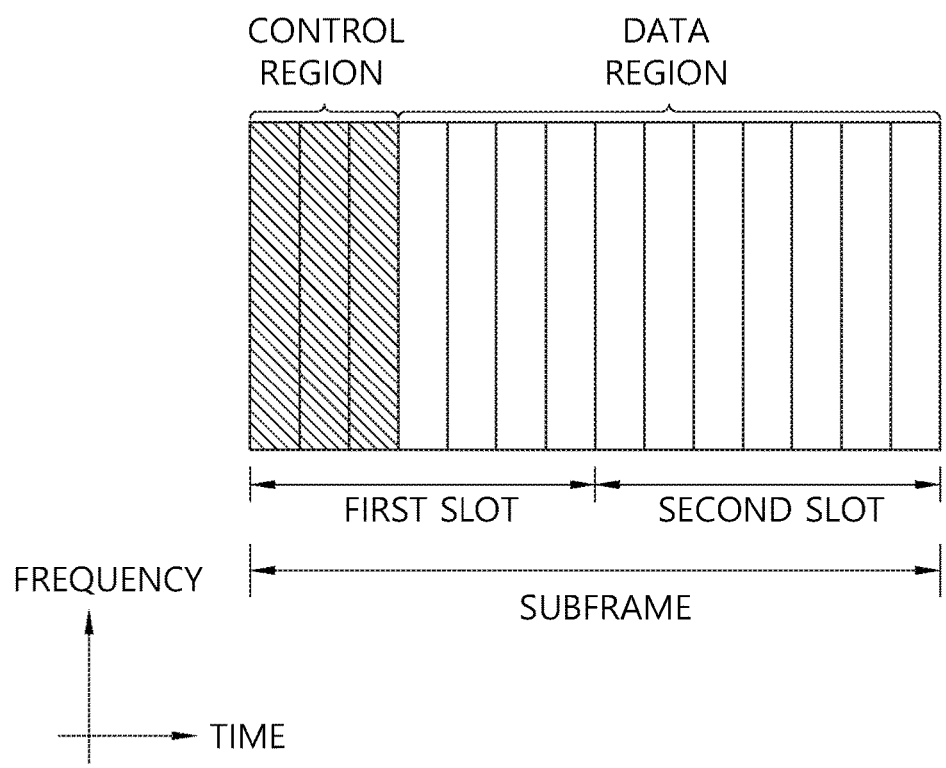
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission on mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |

TABLE 2-continued

| Transmission mode | DCI format | Search space | Transmission mode of PDSCH according to PDCCH |
|---|---|---|---|
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 3

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, a DCI format 0 will be described with reference to section 5.3.3.1.1 of 3GPP TS 36.212 V10.2.0 (2011-06). The DCI format 0 includes a field as listed in a following table.

TABLE 4

| Field | Bit number |
|---|---|
| Carrier indicator | 0 or 3 bits |
| Flag for format0/format1A differentiation | 1 bit |
| FH (Frequency hopping) flag | 1 bit |
| Resource block allocation and hopping resource allocation | |
| MCS (Modulation and coding scheme) and RV (redundancy version) | 5 bits |
| NDI (New data indicator) | 1 bit |
| TPC | 2 bits |
| Cyclic shift for DM RS and OCC index | 3 bit |
| UL index | 2 bits |
| DAI (Downlink Allocation Index) | 2 bits |
| CSI request | 1 or 2 bits |
| SRS request | 0 or 1 bit |
| Resource allocation type | 1 bit |

In the above table, the redundancy version (RV) is used for the HARQ operation that will be described below. The redundancy version (RV) field may include any one of 1, 2, 3 and 4. 1, 2, 3, and 4 are repeatedly used in circular manner.

The uplink channels include a PUSCH, a PUCCH, an SRS (Sounding Reference Signal), and a PRACH (physical random access channel).

Figure 6:
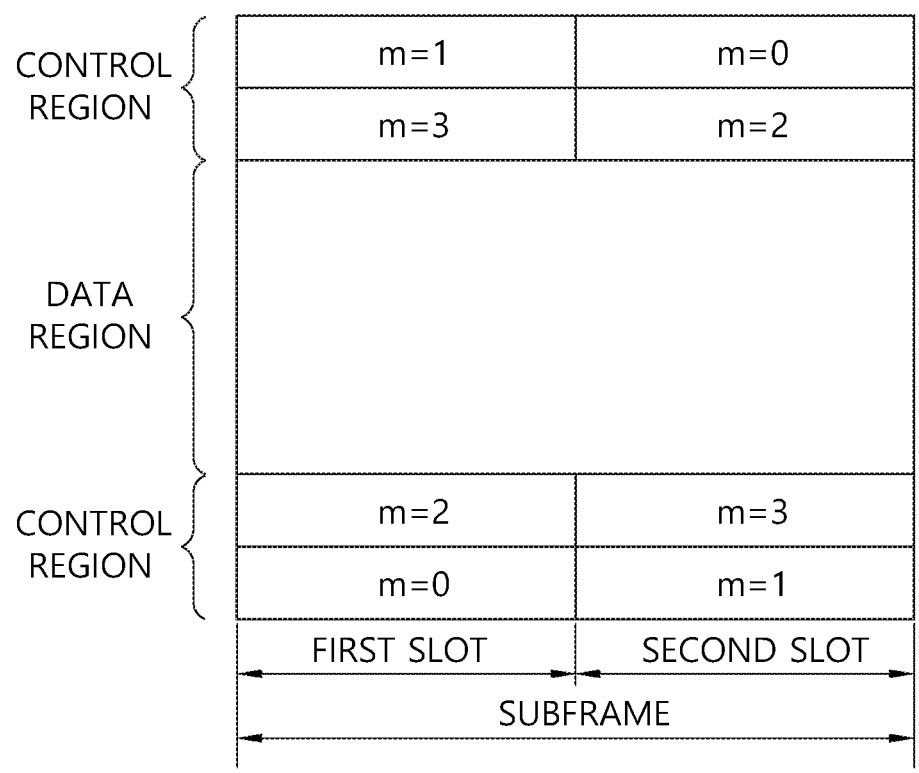
FIG. 6 shows a structure of an uplink subframe in 3GPP LTE.

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Figure 7:
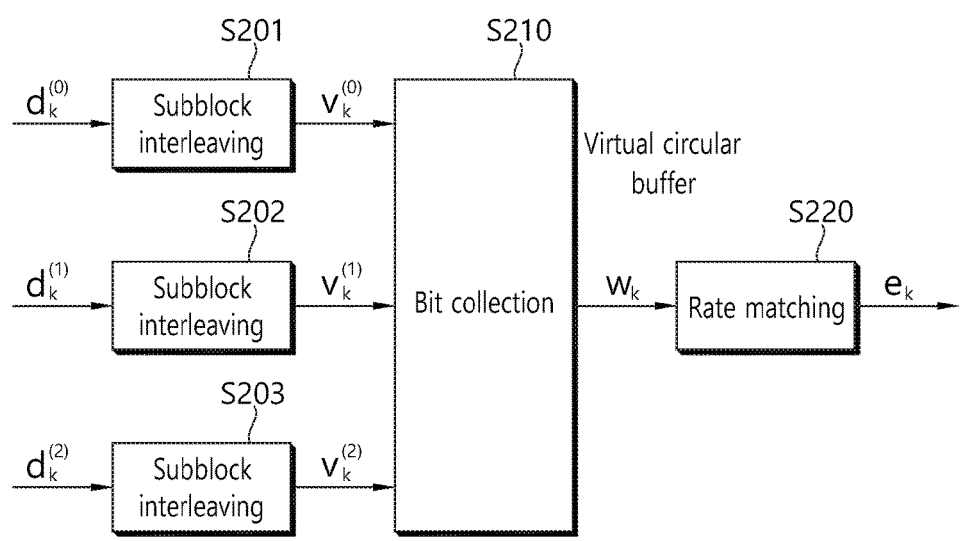
FIG. 7 illustrates a rate matching process for a transport block of PDSCH.

FIG. 7 illustrates a rate matching process for a transport block of PDSCH.

First, when a coded data, that is, a codeword is generated by encoding data that constructs a transport block of PDSCH according to a predetermined coding scheme, three bit stream of the codeword, dk(0), dk(1) and dk(2) are interleaved for each subblock. As a result of the subblock interleaving, vk(0), vk(1) and vk(2) are outputted.

The bits including vk(0), vk(1) and vk(2) are corrected, and circular buffer is generated. a length of the circular buffer is Kw=3Π, and may be represented by wk=vk(0), wKΠ+k=vk(1), w2KΠ+k=vk(2).

Subsequently, a rate matching is performed. When a length of output sequence of rate matching is E, as a result of rate matching, sequence ek of which length is e is outputted.

Figure 8:
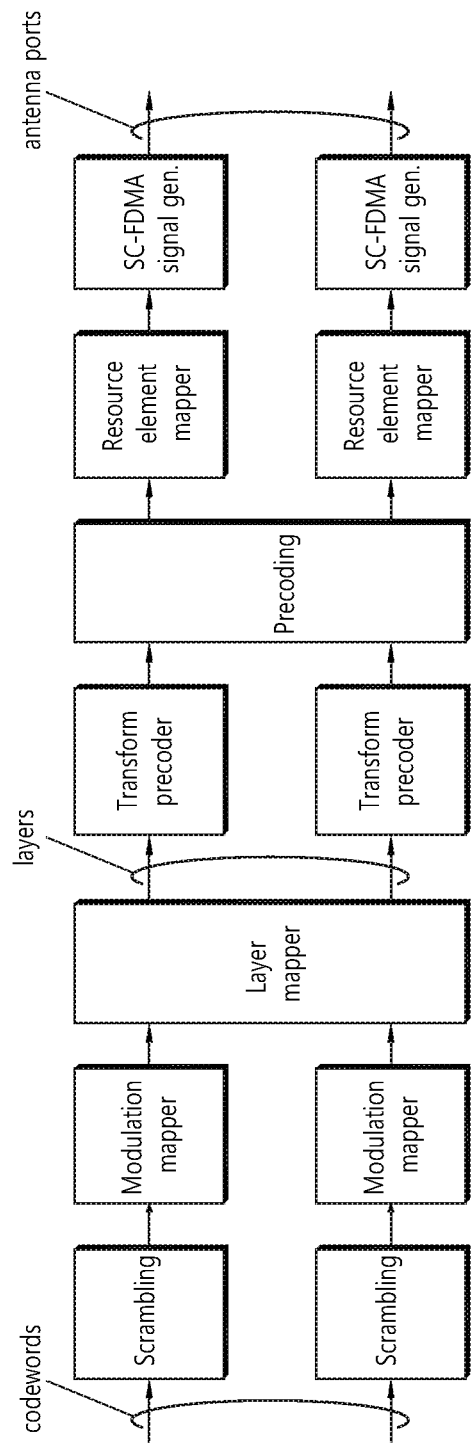
FIG. 8 illustrates a signal processing process for a PDSCH transmission.

FIG. 8 illustrates a signal processing process for a PDSCH transmission.

Referring to FIG. 8, a scrambling unit, a modulation mapper, a layer mapper, a precoding unit, a resource element mapper and OFDMA signal generation unit are included. The scrambling unit performs scrambling for a codeword input. The modulation mapper arranges the scrambled codeword to a modulation symbol that represents a location on signal constellation. The resource element mapper maps the symbol outputted from the precoding unit to a resource element.

In describing operations by reference to FIG. 8, the input codeword is scrambled by the scrambling unit, and generated as an OFDM signal through the modulation by the modulation mapper, the layer mapping by the layer mapper, precoding and resource element mapping by the resource element mapper, and then transmitted through an antenna. The resource element mapper maps the symbol outputted from the precoding unit, shown in FIG. 8, to a resource element.

Figure 9:
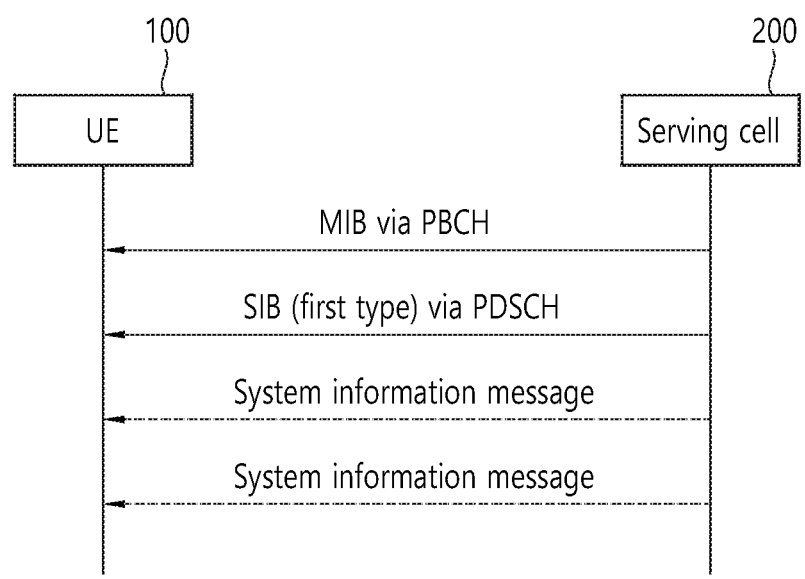
FIG. 9 illustrates an example of a transmission of system information.

FIG. 9 illustrates an example of a transmission of system information.

The system information is divided by a master information block (MIB) and a plurality of system information blocks (SIB s). The MIB includes the physical layer information which is the most important in a cell. The SIB has many types. The SIB of a first type (SIB type 1) includes information used for verifying whether a UE is allowed to access a cell, and includes scheduling information of SIB of other types. The SIB of a second type (SIB type 2) includes common and shared channel information. The SIB of a third type (SIB type 3) includes cell reselection information mainly related to a serving cell. The SIB of a fourth type (SIB type 4) includes frequency information of a serving cell and intra frequency information of a neighbor cell related to the cell reselection. The SIB of a fifth type (SIB type 5) includes information on other E-UTRA frequency and information on inter frequency of a neighbor cell related to the cell reselection. The SIB of the sixth type (SIB type 6) includes information on UTRA frequency and information on UTRA neighbor cell related to the cell reselection. The SIB of the seventh type (SIB type 7) includes information on GERAN frequency related to the cell reselection.

As we can know by referring to FIG. 10, the MIB is delivered to a UE 10 on the PBCH. In addition, the MIB is delivered to the UE 10 by being mapped to the SIB of the first type (SIB type 1) DL-SCH. SIBs of other types are delivered to the UE on the PDSCH through a system information message.

Meanwhile, the MTC will be described below.

Figure 10A:
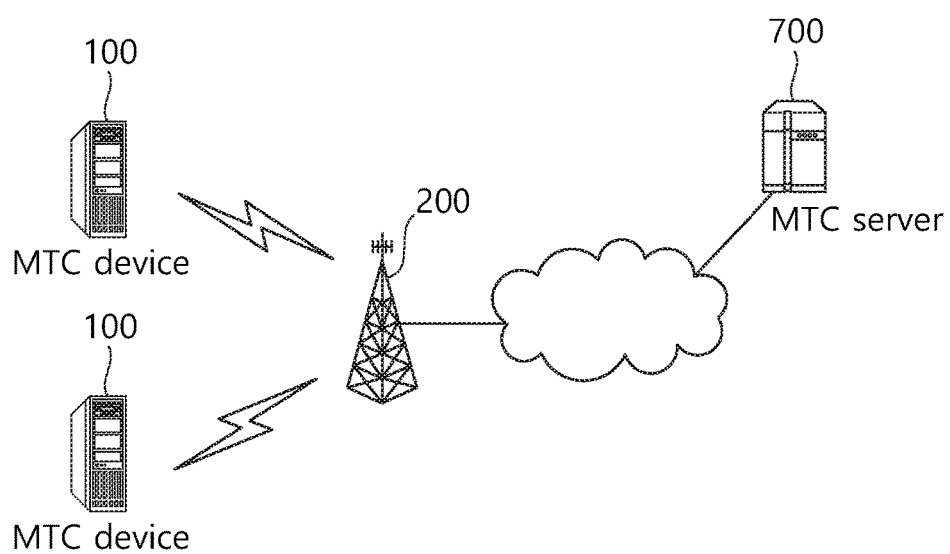
FIG. 10a illustrates an example of a machine type communication (MTC).

FIG. 10a illustrates an example of a machine type communication (MTC).

The machine type communication (MTC) refers to information exchange among MTC devices 100 that human interaction is not accompanied through a BS 200 or information exchange between the MTC device 100 and an MTC server 700 through the BS 200.

The MTC server 700 is an entity that communicates with the MTC device 100. The MTC server 700 executes MTC applications and provides MTC-specific services to the MTC device.

The MTC device is a wireless device that provides MTC communication, and may be fixed or mobile.

The services provided by the MTC are different from the services in the convention communication in which human is involved, and may include various kinds of services including tracking, metering, payment, medical service, remote control, and the like. In more particularly, the services provided by the MTC may include meter check, measuring water level, application of surveillance camera, stock report of vending machine, and so on.

In the MTC device, amount of transmission data is small and uplink/downlink data transmission/reception occurs sometimes. Accordingly, the peculiarity of MTC device is that it is efficient to decrease unit price of a MTC device and decrease battery power consumption with being adjusted to the low data transmission rate. Such an MTC device is characterized by low mobility, and accordingly, has characteristic that a channel environment is hardly changed.

Figure 10B:
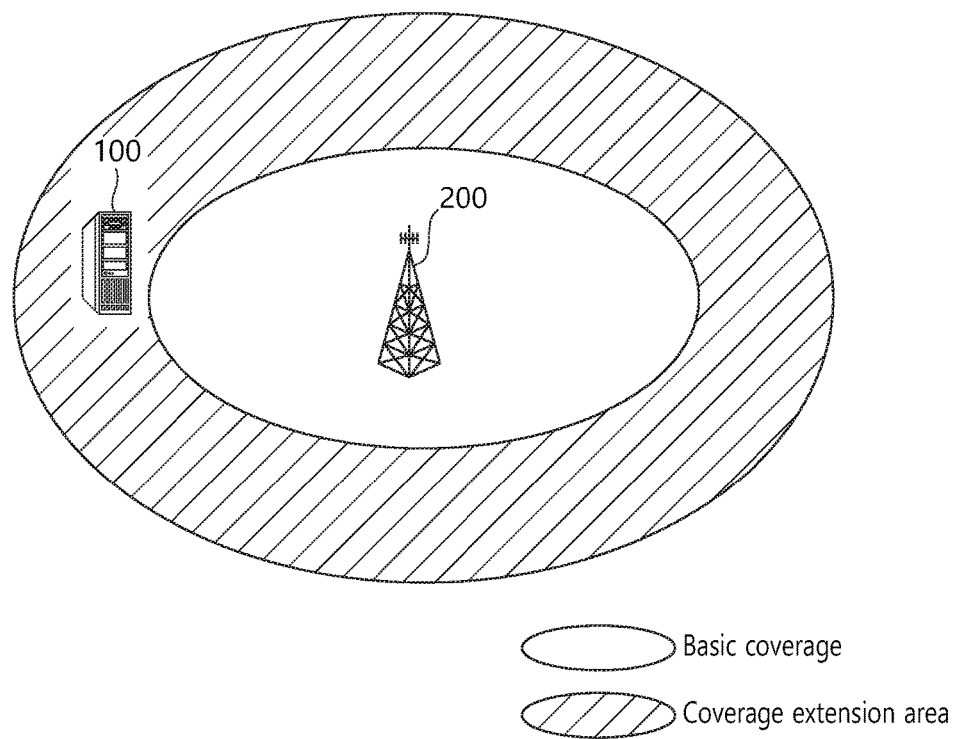
FIG. 10b exemplifies a cell coverage extension for an MTC device.

FIG. 10b exemplifies a cell coverage extension for an MTC device.

Recently, it has been considered to extend the cell coverage of BS for an MTC device 100, and various techniques for the cell coverage extension are discussed.

However, in case that coverage of cell is extended, if a BS transmits the PDCCH that includes a PDSCH and the scheduling information of the PDSCH to the MTC device located in the coverage extension area, like the BS transmits to a normal UE, the MTC device has difficulty in receiving them.

<A First Disclosures of the Present Specification>

Accordingly, disclosures of the present specification are with the purpose of proposing a way to solve the above problems.

In order to solve the problems above described, according to a first disclosure of the present specification, in case that a BS transmits a PDSCH and a PDCCH to an MTC device 100 located in a coverage extension area, it is implemented that the BS repeatedly transmit the PDSCH and the PDCCH on several subframes (e.g., bundle subframe). Accordingly, the MTC device receives a bundle of PDCCHs through several subframes and decodes the bundle of PDCCHs, thereby increasing success rate of decoding. That is, by using a part or the whole of the bundles of PDCCHs received through several subframes, the PDCCH may be successfully decoded. In other words, the MTC device decodes the bundle of PDCCHs in which identical PDCCHs are repeated, thereby increasing success rate of decoding. Similarly, the MTC device receives a bundle of PDSCHs through several subframes and decodes the bundle of PDSCHs, thereby increasing success rate of decoding. Similarly, the MTC device located in a coverage extension area may transmit a bundle of PUCCHs through several subframes.

Similarly, the MTC device may transmit a bundle of PUSCHs through several subframes.

Figure 11:
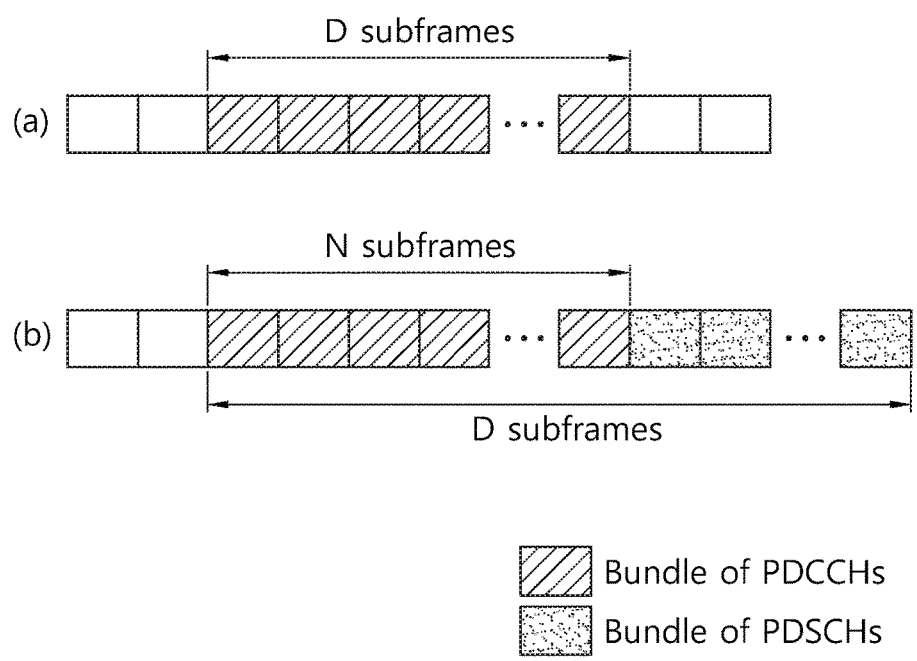
FIG. 11 illustrates an example of transmitting a bundle of PDCCHs and a bundle of PDSCH.

FIG. 11 illustrates an example of transmitting a bundle of PDCCHs and a bundle of PDSCH.

Referring to FIG. 11 (a), from the subframe in which a bundle of PDCCHs is started to be transmitted, a transmission of a bundle of PDSCHs may also be started. And the transmission of the bundle of PDCCHs and the bundle of PDSCHs may be terminated at the same time.

On the other hand, as we can know by reference to FIG. 11 (b), the transmission of the bundle of PDCCHs and the bundle of PDSCHs is started from the same subframe, but the termination of the bundle of PDCCHs may be earlier than the termination of the bundle of PDSCHs.

However, in case that the transmission of the bundle of PDCCHs and the bundle of PDSCHs is started from the same subframe, the MTC device is unable to receive and decode accurate scheduling information (e.g., MCS of the PDSCH, RB allocation, and redundancy version (RV)) until completing reception of the bundle of PDCCHs, the MTC device should start to receive the bundle of PDSCHs. At the moment, since the MTC device is still not available to decode the bundle of PDSCHs, the MTC device is not available to store and combine the information in the PDSCH in a bit level or a symbol level. Consequently, the MTC device assumes that each PDSCH in the bundle of PDSCHs is received on the same RE location in each subframe, and should combine with the same RE (i.e., RE level combining).

However, although the MTC device assumes that each PDSCH in the bundle of PDSCHs is received on the same RE location in each subframe, and performs to combine with the same RE as such, there is a problem that actually the BS may not transmit each PDSCH in the bundle of PDSCHs on the same RE location in each subframe.

Accordingly, a second disclosure of the present specification proposes a technique to solve the problem.

<A Second Disclosure of the Present Specification>

In order to solve the above described problem, the second disclosure of the present specification may be implemented that a BS transmits each PDSCH in a bundle of PDSCHs on the same RE location in each subframe such that an MTC device may perform a RE level combining) However, if a RE used for a transmission of a PDSCH in a specific subframe is used for a transmission of other channel or signal, not the PDSCH, in other subframe, the second disclosure of the present specification proposes to transmit the PDSCH by puncturing in the RE of the corresponding subframe.

Meanwhile, hereinafter, embodiments of the second disclosure of the present specification will be described in detail.

In a situation where a transmission of a bundle of PDCCHs and a bundle of PDSCHs is started on the same subframe for an MTC device which is located in a coverage extension area, if respective location and number of REs that a PDSCH is mapped for each subframe are not the same, it may be required to designate locations of a RE that is to perform rate-matching and a RE that is to perform puncturing when mapping a RE to a PDSCH such that the same data/symbol is to be located in the same RE for each subframe. This will be described by reference to FIG. 12 as below.

FIG. 12 illustrates an example of comparing subframes which a bundle of PDCCHs and a bundle of PDSCH are transmitted.

In case that PDCCH, PDSCH, CRS, PSS/SSS and PBCH are transmitted on the subframe shown in FIG. 12 (b), while PDCCH, PDSCH and CRS are transmitted on the subframe shown in FIG. 12 (a), the PDSCH may be transmitted by rate-matching in the RE where the PDCCH and the CRS are transmitted, and the PDSCH may be puncturing in the RE where the PSS/SSS and the PBCH are transmitted.

At the moment, a BS and an MTC device are required to share location information of the RE that is to perform rate-matching of the PDSCH and the RE that is to perform puncturing of the PDSCH. For this, in the present specification, it is proposed to determine the RE that is to perform rate-matching of the PDSCH and the RE that is to perform puncturing of the PDSCH as below.

A. RE Mapping of a First Subframe in a Bundle of PDSCHs, as a Standard

In order to determine a RE that is to perform rate-matching of PDSCH, in the first subframe among a plurality of subframes in which the same PDSCH is repeatedly transmitted, the PDSCH may be mapped to a RE of the subsequent subframes according to the standard that the PDSCH is mapped to a RE. That is, a BS may perform mapping the PDSCH to the RE of the first subframe following the existing rule, and in the remaining subframes, may perform mapping according to the standard that the PDSCH is mapped to a RE of the first subframe. This will be described by reference to FIG. 13 as below.

Figure 13:
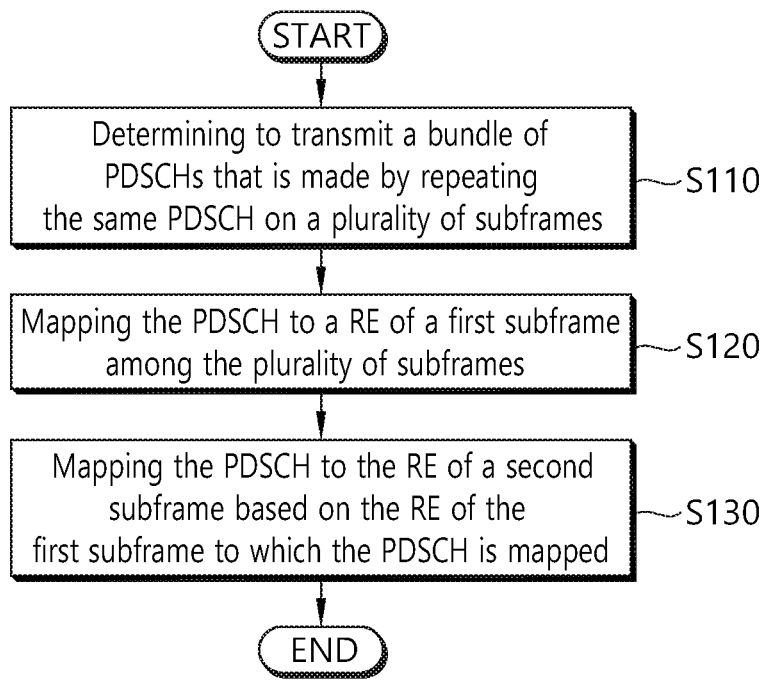
FIG. 13 illustrates an example of a method according to an embodiment.

FIG. 13 illustrates an example of a method according to an embodiment.

As we can know by reference to FIG. 13, in case that a BS is determined to perform a transmission of a bundle of PDSCHs that is transmitting the same PDSCH repeatedly to an MTC device on a plurality of subframes (step, S110), the BS performs mapping the PDSCH to a RE of a first subframe among the plurality of subframes (step, S120). Subsequently, in order for the MTC device to decode the bundle of PDSCHs through a combination of RE unit, the BS performs mapping the PDSCH to the RE of a second subframe among the plurality of subframes based on the standard of the RE of the first subframe to which the PDSCH is mapped (step, S130).

At the moment, in case that the same location of the RE location of the first subframe to which the PDSCH is mapped is used for other channels and signals in the second subframe, the PDSCH may be puncturing in the corresponding RE location of the second subframe.

Or, in case that the PDSCH may be mapped to the RE since other signals or channels are not transmitted in the second subframe by the RE to which the PDSCH is not mapped in the first subframe, a zero-power transmission may be performed in the corresponding RE. Or, the PDSCH of other RE may be copied and transmitted in the corresponding RE. For example, in the corresponding RE, a symbol transmitted in the RE of the PDSCH that corresponds to previous or the next index may be copied and transmitted.

B. RE Mapping in which all REs are Used for PDSCH

In order to determine a RE that is to perform rate-matching of PDSCH, a PDSCH RE mapping standard in which the PDSCH is transmitted through all REs in a specific RB may be applied. In other words, after mapping the PDSCH sequentially for all REs in the RB first, and the PDSCH may be puncturing unconditionally in the RE to which other channels or signals are transmitted.

For example, in case that only PDCCH, PDSCH and CRS are transmitted on subframe n among a plurality of subframes on which a bundle of PDSCHs is transmitted, it may be implemented that, after mapping the PDSCH to all REs of the subframe n, each of the PDCCH and the CRS are transmitted by puncturing the mapped PDSCH for the RE region to which the PDCCH and the CRS are transmitted. In case that PDCCH, PDSCH, CRS, CSI-RS and PSS/SSS are transmitted on other subframe m, similarly, after mapping the PDSCH to the all REs of the subframe m, then the mapped PDSCH may be puncturing in the RE to which the PDCCH, the CRS, the CSI-RS and the PSS/SSS are transmitted.

C. RE Mapping by Considering Only PDCCH

In order to determine a RE that is to perform rate-matching of PDSCH, a PDSCH RE mapping may be performed by rate-matching the PDSCH for the OFDM symbol in which the PDCCH is transmitted and transmitting the PDSCH through all REs in the remaining symbol. At the moment, in a plurality of subframes on which a bundle of PDSCHs is transmitted, the number of OFDM symbol on which the PDCCH is transmitted may be the same. That is, a BS may perform sequentially mapping the PDSCH to the RE of the remaining symbols except for the OFDM symbol on which the PDCCH is transmitted first, then puncturing the PDSCH in the RE on which other channels or signals are to be transmitted.

For example, PDCCH, PDSCH and CRS are transmitted on subframe n among a plurality of subframes on which a bundle of PDSCHs is transmitted, after mapping the PDSCH to the RE region of the remaining OFDM symbols except the OFDM symbol on which the PDCCH is transmitted first, the mapped PDSCH may be puncturing in the RE to which the CRS is transmitted. In case that PDCCH, PDSCH, CRS, CSI-RS and PSS/SSS are transmitted on other subframe m, after mapping the PDSCH to the RE region of the remaining OFDM symbols except the OFDM symbol on which the PDCCH is transmitted, the mapped PDSCH may be puncturing in the RE to which the CRS, the CSI-RS and the PSS/SSS are transmitted.

Or, on a specific subframe, the PDCCH may not be transmitted or the less PDCCH may be transmitted in comparison with other subframes. In this case, for example, the OFDM symbol, which was used for transmitting the PDCCH in other subframe, may be used for transmitting the PDSCH.

D. RE Mapping by Considering PDCCH and CRS

In order to determine a RE that is to perform rate-matching of PDSCH, a PDSCH RE mapping may be performed by rate-matching the PDSCH for the RE to which the OFDM symbol in which the PDCCH and the CRS are transmitted and transmitting the PDSCH through the RE region in which the CRS is not transmitted among the remaining OFDM symbols in which the PDCCH is not transmitted. At the moment, the number of CRS port is depending on the configuration of the corresponding cell. At the moment, in a plurality of subframes on which a bundle of PDSCHs is transmitted, the number of OFDM symbol on which the PDCCH is transmitted may be the same. That is, the BS may perform sequentially mapping the PDSCH to the remaining RE except for the OFDM symbol on which the PDCCH is transmitted and the RE to which the CRS is transmitted first, and puncturing the PDSCH in the RE on which other channels or signals are transmitted.

For example, PDCCH, PDSCH and CRS are transmitted on subframe n in a bundle of PDSCHs is transmitted, after mapping the PDSCH to the remaining RE except the OFDM symbol on which the PDCCH is transmitted and the RE to which the CRS is transmitted first, then the PDSCH may be transmitted on the mapped PDSCH. In case that PDCCH, PDSCH, CRS, CSI-RS and PSS/SSS are transmitted on other subframe m, after mapping the PDSCH to the remaining RE except the OFDM symbol on which the PDCCH is transmitted and the RE to which the CRS is transmitted first, the mapped PDSCH may be puncturing in the RE to which the CSI-RS and the PSS/SSS are transmitted.

At the moment, in case that the PDSCH is transmitted but the CRS is not transmitted in a specific subframe (e.g., the case that the PDSCH is transmitted in MBSFN subframe), the PDSCH may be transmitted through a RE to which the CRS is not transmitted in the corresponding subframe. As such, in case that the PDSCH may be transmitted through the corresponding RE since the CRS is not transmitted, a zero-power transmission may be performed in the corresponding RE. Or, in the corresponding RE, the PDSCH of other RE may be copied and transmitted. For example, in the corresponding RE, a symbol transmitted from a PDSCH RE that corresponds to previous or the next index may be copied and transmitted.

Or, in a specific subframe, the PDCCH may not be transmitted or the less PDCCH may be transmitted in comparison with other subframes (e.g., in case that the PDSCH is transmitted in MBSFN subframe). In such a case, for example, the OFDM symbol which was used for transmitting the PDCCH in other subframe may be used for transmitting the PDSCH. This will be described in detail by reference to FIG. 14a and FIG. 14b.

Figure 14A:
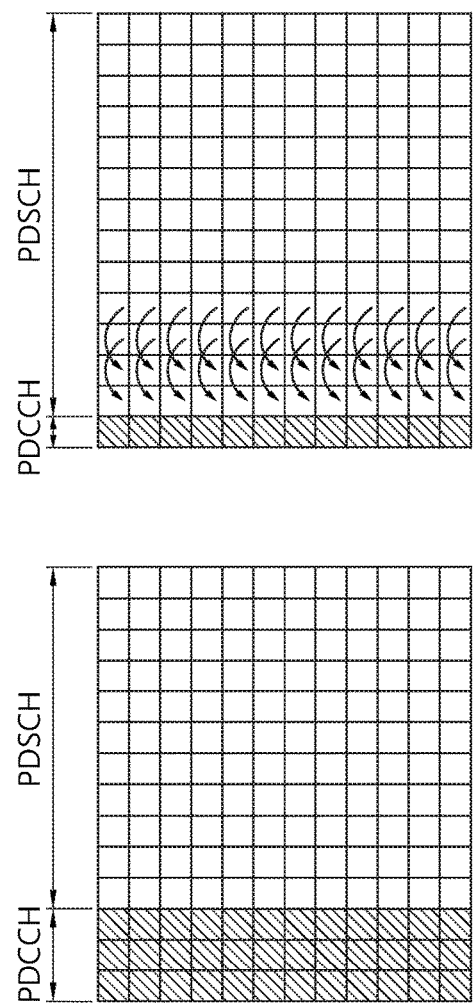
FIG. 14a and FIG. 14b illustrate a situation that a number of OFDM symbols in which a PDCCH is transmitted is different for each subframe.
Figure 14B:
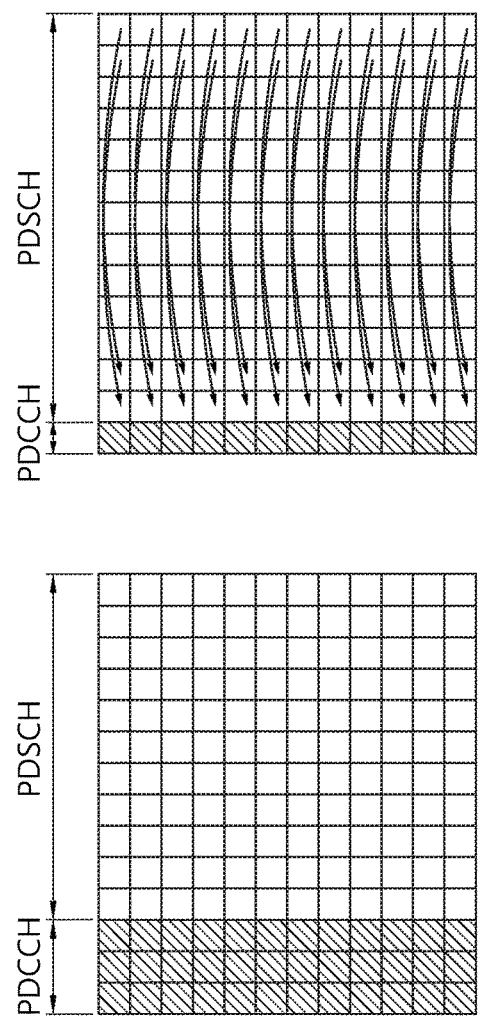

FIG. 14a and FIG. 14b illustrate a situation that a number of OFDM symbols in which a PDCCH is transmitted is different for each subframe.

As we can know by reference to FIG. 14a, in case that the PDCCH is transmitted on three symbols (symbol 0 to symbol 2) in a first subframe, but is transmitted only on one symbol (symbol 0) in a second subframe, a BS may copy symbol 3 and symbol 4 of the second subframe to symbol 1 and symbol 2.

Or, as we can know by reference to FIG. 14b, in case that the PDCCH is transmitted on three symbols (symbol 0 to symbol 2) in a first subframe, but is transmitted only on one symbol (symbol 0) in a second subframe, a BS may copy symbol 12 and symbol 13 of the second subframe to symbol 1 and symbol 2.

E. RE Mapping by Considering Only Channel/Signal Commonly Transmitted in all Subframes In order to determine a RE that is to perform rate-matching of PDSCH, by considering only the channel/signal which is commonly transmitted in all case in a plurality of subframes in which a bundle of PDSCHs is transmitted, the rate-matching of PDSCH may be performed in the RE region to which the corresponding channel/signal is transmitted, and the PDSCH may be transmitted in the remaining RE region. That is, the BS may perform sequentially mapping the PDSCH to the remaining RE except for the RE region to which the channel/signal which is commonly transmitted among a plurality of subframes in which the bundle of PDSCHs is transmitted, and in case that other channel/signal is transmitted through the corresponding RE region, the mapped PDSCH may be puncturing in the corresponding RE.

For example, in case that PDCCH and CRS are commonly transmitted in a plurality of subframes in which the bundle of PDSCHs is transmitted, after mapping the PDSCH to the remaining RE except the OFDM symbol on which the PDCCH is transmitted and the RE to which the CRS is transmitted, then the PDSCH may be transmitted. In case that PDCCH, PDSCH, CRS and CSI-RS are transmitted on a specific subframe, after mapping the PDSCH to the remaining RE except the OFDM symbol on which the PDCCH is transmitted and the RE to which the CRS is transmitted, the mapped PDSCH may be puncturing in the RE to which the CSI-RS is transmitted. In case that PDCCH, PDSCH, CRS and PSS/SSS are transmitted on another specific subframe, after mapping the PDSCH to the remaining RE except the OFDM symbol on which the PDCCH is transmitted and the RE to which the CRS is transmitted, the mapped PDSCH may be puncturing in the RE to which the CSI-RS and the PSS/SSS are transmitted.

The embodiments of the present invention described so far may be implemented through various means. For example, the embodiments of the present invention may be implemented by hardware, firmware, software or the combination thereof. Particularly, this will be described by reference to drawing.

Figure 15:
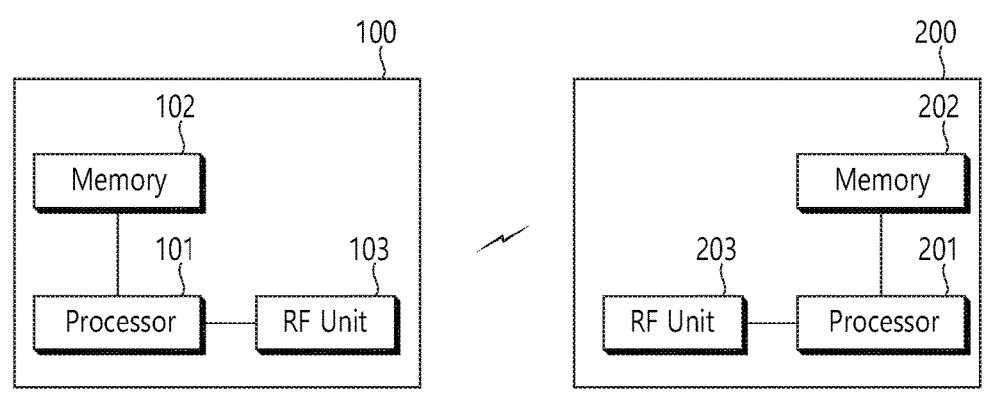
FIG. 15 is a block diagram illustrating a wireless communication system in which a disclosure of the present specification is implemented.

FIG. 15 is a block diagram illustrating a wireless communication system in which a disclosure of the present specification is implemented.

A BS 200 includes a processor 201, a memory 202, and an RF (radio frequency) unit (the MTC device) 203. The memory 202 which is coupled to the processor 201 stores a variety of information for driving the processor 201. The RF unit 203 which is coupled to the processor 201 transmits and/or receives a radio signal. The processor 201 implements the proposed functions, procedure, and/or methods. In the embodiments described above, the operation of BS may be implemented by the processor 201.

An MTC device 100 includes a processor 101, a memory 102, and an RF (radio frequency) unit 103. The memory 102 which is coupled to the processor 101 stores a variety of information for driving the processor 101. The RF unit 103 which is coupled to the processor 101 transmits and/or receives a radio signal. The processor 101 implements the proposed functions, procedure, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:
1. A method for receiving a physical downlink shared channel (PDSCH), the method performed by a device and comprising:
if the device is configured for a coverage enhancement, receiving a downlink control channel with repetitions;

receiving the PDSCH, which is repeated in a plurality of subframes, based on the downlink control channel, wherein the receiving of the PDSCH includes:

considering that one or more resource elements (REs), which are related to positions of a cell-specific reference signal (CRS), in a multicast-broadcast single-frequency network (MBSFN) subframe are not used for mapping the PDSCH, if the MBSFN subframe exists among the plurality of subframes for receiving the PDSCH; and considering that the downlink control channel is not transmitted on at least one subframe among the plurality of subframes for receiving the PDSCH.

2. The method of claim 1, wherein the receiving of the PDSCH further includes:

considering that at least one RE, on which CRS is not transmitted, in the MBSFN subframe is used for mapping the PDSCH.

3. The method of claim 1, wherein the receiving of the PDSCH further includes:

considering that at least one RE, on which synchronization signals are transmitted, in a subframe is used for mapping the PDSCH, but is not used for transmitting the PDSCH.

4. The method of claim 3, wherein the receiving of the PDSCH further includes:

considering that the PDSCH is punctured on the at least one RE, on which the synchronization signals are transmitted.

5. The method of claim 1, wherein the receiving of the PDSCH further includes:

considering that at least one RE, on which a physical broadcast channel (PBCH) is transmitted, in a subframe is used for the mapping the PDSCH, but is not used for transmitting the PDSCH.

6. The method of claim 5, wherein the receiving of the PDSCH further includes:

considering that the PDSCH is punctured on the at least one RE, on which the PBCH is transmitted.

7. The method of claim 1, wherein the one or more REs of the MBSFN subframe, which are related to the position of the CRS, are used for a zero-power transmission.

8. A device for receiving a physical downlink shared channel (PDSCH), comprising:

a transceiver configured to receive a downlink control channel with repetitions if the device is configured for a coverage enhancement and to receive the PDSCH which is repeated in a plurality of subframes, based on the reception of the downlink control channel; and a processor configured to control the transceiver, wherein in order to receive the PDSCH, the processor is configured to:

consider that one or more resource elements (REs), which are related to positions of a cell-specific reference signal (CRS) is transmitted, in a multicast-broadcast single-frequency network (MBSFN) subframe are not used for mapping the PDSCH, if the MBSFN subframe exists among the plurality of subframes for receiving the PDSCH; and consider that the downlink control channel is not transmitted on at least one subframe among the plurality of subframes for receiving the PDSCH.

9. The device of claim 8, wherein in order to receive the PDSCH, the processor is further configured to:

consider that at least one RE, on which CRS is not transmitted, in the MBSFN subframe is used for mapping the PDSCH.

10. The device of claim 8, wherein in order to the PDSCH, the processor is further configured to:

consider that at least one RE, on which synchronization signals are transmitted, in a subframe is used for mapping the PDSCH, but is not used for transmitting the PDSCH.

11. The device of claim 10, wherein in order to receive the PDSCH, the processor is further configured to:

consider that the PDSCH is punctured on the at least one RE, on which the synchronization signals are transmitted.

12. The device of claim 10, wherein in order to receive the PDSCH, the processor is further configured to:

consider that at least one RE, on which a physical broadcast channel (PBCH) is transmitted, in a subframe is used for the mapping the PDSCH, but is not used for transmitting the PDSCH.

13. The device of claim 12, wherein in order to receive the PDSCH, the processor is further configured to:

consider that the PDSCH is punctured on the at least one RE, on which the PBCH is transmitted.

* * * * *